United States Patent
Rostum et al.

(10) Patent No.: US 12,360,871 B2
(45) Date of Patent: Jul. 15, 2025

(54) PERIPHERAL COMPONENT INTERCONNECT BOARD PROGRAMMABLE LINK TRAINING AND STATUS STATE MACHINE AND STATE BRANCHING

(71) Applicant: VIAVI Solutions Inc., Chandler, AZ (US)

(72) Inventors: Tarik Rostum, Colorado Springs, CO (US); Marc Werz, Stuttgart (DE)

(73) Assignee: VIAVI Solutions Inc., Chandler, AZ (US)

( * ) Notice: Subject to any disclaimer, the term of this patent is extended or adjusted under 35 U.S.C. 154(b) by 35 days.

(21) Appl. No.: 18/539,593

(22) Filed: Dec. 14, 2023

(65) Prior Publication Data
US 2024/0202088 A1    Jun. 20, 2024

Related U.S. Application Data

(60) Provisional application No. 63/387,630, filed on Dec. 15, 2022.

(51) Int. Cl.
*G06F 11/00*    (2006.01)
*G06F 11/27*    (2006.01)
*G06F 13/42*    (2006.01)

(52) U.S. Cl.
CPC ......... *G06F 11/27* (2013.01); *G06F 13/4221* (2013.01)

(58) Field of Classification Search
CPC ........ H04L 43/50; G06F 11/263; G06F 11/27; G06F 11/3684; G06F 11/3688; G06F 13/4221
See application file for complete search history.

(56) References Cited

U.S. PATENT DOCUMENTS

2023/0104150 A1* 4/2023 Sunayama ............ G06F 11/221
                                                             714/30
2023/0116669 A1* 4/2023 Sunayama .............. G06F 11/27
                                                             714/30

OTHER PUBLICATIONS

Jha, Kamini et al., Design and Verification of LTSSM in USB 3.0, 2018, IEEE (Year: 2018).*

* cited by examiner

*Primary Examiner* — Marc Duncan
(74) *Attorney, Agent, or Firm* — Harrity & Harrity, LLP

(57) ABSTRACT

A device may generate a link training and status state machine (LTSSM) test configuration that includes states and paths connecting the states, and may provide the LTSSM test configuration for tracing through by a device under test. The device may receive results associated with tracing through of the LTSSM test configuration by the device under test, and may modify, based on the results, one of the paths of the LTSSM test configuration to include a different one of the states and to generate a modified LTSSM test configuration. The device may provide the modified LTSSM test configuration for tracing through by the device under test.

20 Claims, 12 Drawing Sheets

Example LTSSM path comparator registers

| | |
|---|---|
| ltssm_path_cmpr_index_X | Selects the path comparator X (0-3) |
| ltssm_path_cmpr_index_Y | Selects element Y (0-15) within a path comparator X |
| ltssm_path_cmpr_X_config_state_Y | Defines the state for element Y |
| ltssm_path_cmpr_X_config_link_and_eq_Y | Defines the link speed and EQ phase for element Y |
| ltssm_path_cmpr_X_state_vars_Y | Defines the variables for element Y |
| ltssm_path_cmpr_X_state_entry_action_Y | Defines the entry action for element Y |
| ltssm_path_cmpr_X_state_activity_Y | Defines the activity (OS override) for element Y |

FIG. 1F

Example control state registers

| | |
|---|---|
| ltssm_user_state_index_Z | Selects the control state Z (0-3) |
| ltssm_user_state_Z_config_state_trans | Defines the condition for control state Z (timeout and/or OS comparators). Defines target state for this transition. |
| ltssm_path_cmpr_X_config_state_Y | Defines the state for element Y |
| ltssm_user_state_Z_config_activity | Defines configuration activity |
| ltssm_user_state_Z_timeout_to_next_state | Timeout value. Only used if the timeout is enabled in ltssm_user_state_Z_config_state_trans. |
| ltssm_user_state_Z_state_vars_forces | Allows user to change the value for some state variables |

FIG. 1I

PERIPHERAL COMPONENT INTERCONNECT BOARD PROGRAMMABLE LINK TRAINING AND STATUS STATE MACHINE AND STATE BRANCHING

CROSS-REFERENCE TO RELATED APPLICATION

This patent application claims priority to U.S. Provisional 63/387,630, filed on Dec. 15, 2022, and entitled "PERIPHERAL COMPONENT INTERCONNECT BOARD PROGRAMMABLE LINK TRAINING AND STATUS STATE MACHINE AND STATE BRANCHING MECHANISM." The disclosure of the prior application is considered part of and is incorporated by reference into this patent application.

BACKGROUND

A peripheral component interconnect (PCI) board or a PCI express (PCIe) board is a local computer bus for attaching hardware devices in a computer and is part of the PCI local bus standard. The PCI board supports functions found on a processor bus, but in a standardized format that is independent of any given processor's native bus. Devices connected to the PCI board appear to a bus master to be connected directly to its own bus and are assigned addresses in the processor's address space.

SUMMARY

Some implementations described herein relate to a method. The method may include generating a link training and status state machine (LTSSM) test configuration that includes states and paths connecting the states, and providing the LTSSM test configuration for tracing through by a device under test. The method may include receiving results associated with tracing through of the LTSSM test configuration by the device under test, and modifying, based on the results, one of the paths of the LTSSM test configuration to include a different one of the states and to generate a modified LTSSM test configuration. The method may include providing the modified LTSSM test configuration for tracing through by the device under test.

Some implementations described herein relate to a device. The device may include one or more memories and one or more processors coupled to the one or more memories. The one or more processors may be configured to generate a link training and status state machine (LTSSM) test configuration that includes states and paths connecting the states, and provide the LTSSM test configuration for tracing through by a device under test, where the device under test is an endpoint device or a root complex device. The one or more processors may be configured to receive results associated with tracing through of the LTSSM test configuration by the device under test, and modify, based on the results, one of the paths of the LTSSM test configuration to include a different one of the states and to generate a modified LTSSM test configuration. The one or more processors may be configured to provide the modified LTSSM test configuration for tracing through by the device under test.

Some implementations described herein relate to a non-transitory computer-readable medium that stores a set of instructions. The set of instructions, when executed by one or more processors of a device, may cause the device to generate a link training and status state machine (LTSSM) test configuration that includes states and paths connecting the states, and provide the LTSSM test configuration for tracing through by a device under test. The set of instructions, when executed by one or more processors of the device, may cause the device to receive results associated with tracing through of the LTSSM test configuration by the device under test, and modify, based on the results, the LTSSM test configuration to generate a modified LTSSM test configuration. The set of instructions, when executed by one or more processors of the device, may cause the device to provide the modified LTSSM test configuration for tracing through by the device under test.

BRIEF DESCRIPTION OF THE DRAWINGS

FIGS. 1A-1I are diagrams of an example associated with providing a PCI board programmable link training and status state machine (LTSSM) and state branching mechanism.

DETAILED DESCRIPTION

Figure 1A:
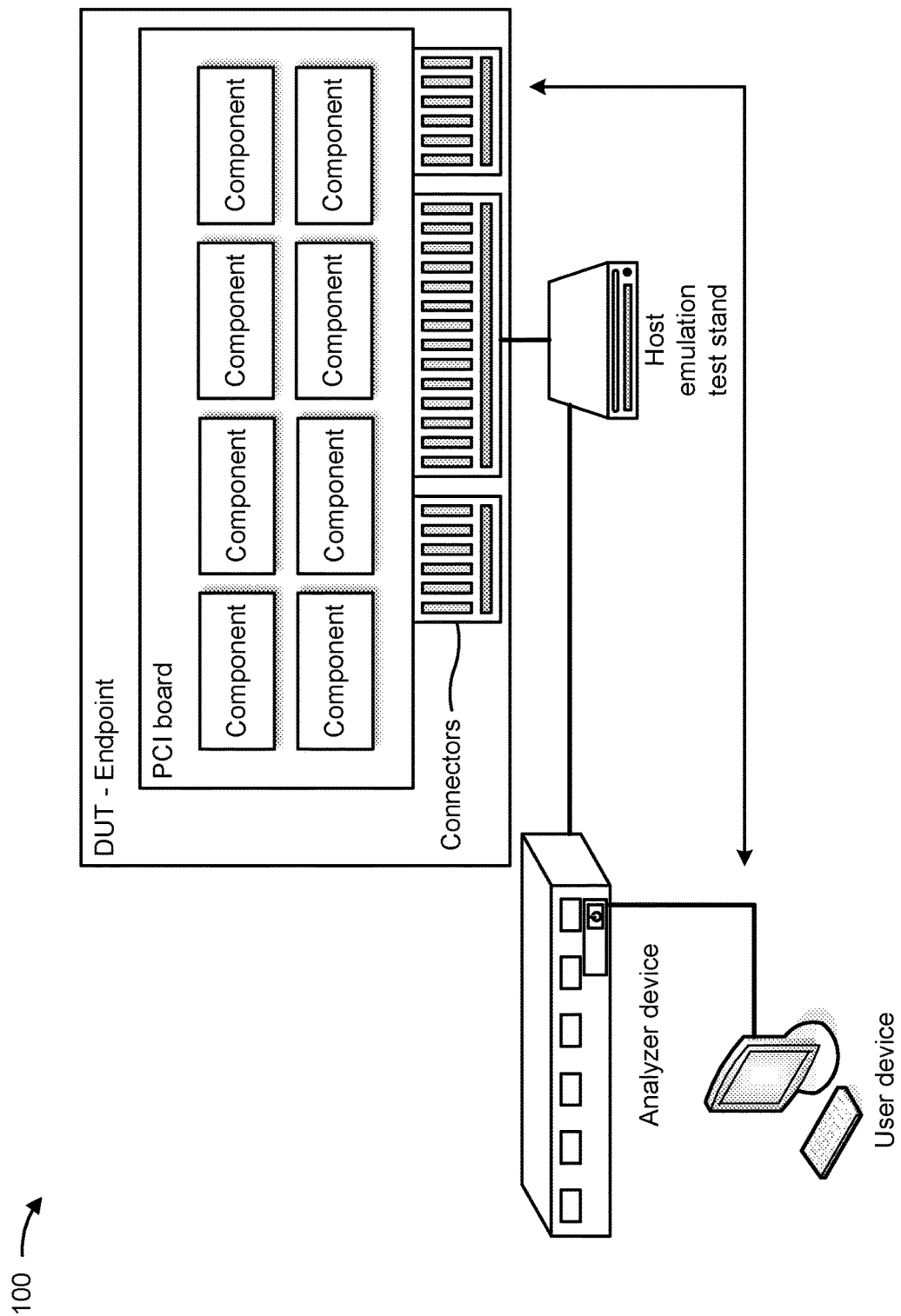

The following detailed description of example implementations refers to the accompanying drawings. The same reference numbers in different drawings may identify the same or similar elements.

A PCI board may be part of a root complex device (e.g., in a PCIe system, a root complex device connects a central processor and a memory subsystem to a PCI Express switch fabric that includes one or more PCIe or PCI devices) or an endpoint device under test. A PCI board in a root complex device may be connected to a current analyzer device via an interposer. A PCI board in an endpoint device may be connected with the current analyzer device via a host emulation test stand. The current analyzer device may communicate with and/or test the root complex device/endpoint device via the PCI board. However, the current analyzer device may be unable to test different states (e.g., other than predetermined states) of the PCI board. A PCIe LTSSM is used in a protocol to configure and initialize a PCI express (PCIe) link; provide a recovery mechanism from link errors; provide a means for a port to enter and exit low power modes; discover and determine an operating link width, rate, and lane ordering; and negotiate any alternate protocols. The LTSSM is complex and operates on a specific rule set that must be followed. However, the current analyzer device is unable to test any and all corner cases covered by the LTSSM.

Some implementations described herein provide a device (e.g., an analyzer device) that provides a PCI board programmable LTSSM and state branching. For example, the analyzer device may generate a link training and status state machine (LTSSM) test configuration that includes states and paths connecting the states, and may provide the LTSSM test configuration for tracing through by a device under test. The analyzer device may receive results associated with tracing through of the LTSSM test configuration by the device under test, and may modify, based on the results, one of the paths of the LTSSM test configuration to include a different one of the states and to generate a modified LTSSM test configuration. The analyzer device may provide the modified LTSSM test configuration for tracing through by the device under test.

In this way, the analyzer device may test different states (e.g., other than predetermined states) of a PCI board. For example, the analyzer device may enable a user to program the analyzer device to break rules defined in the PCI express protocol for LTSSM functionality, and to force a device under test (DUT) into various corner case conditions involving state timing and timeouts, state transitions, link speed changes (e.g., several speed changes back-to-back), lane assignment, error recovery, and/or the like. The analyzer device may define control states that are new states that enable testing of corner cases. The analyzer device may enable a user to program unexpected states for the PCI board, to program PCIe LTSSM, and direct the PCI board into unexpected states and/or control states.

FIGS. 1A-1I are diagrams of an example 100 associated with testing different states (e.g., other than predetermined states) of a PCI board. As shown in FIGS. 1A-1I, the example 100 includes a user device, an analyzer device, a host emulation test stand, an interposer, and a PCI board provided in an endpoint device or a root complex device. The user device may include a computing device that executes software to control operation of the analyzer device and the host emulation test stand/interposer when testing the PCI board. The analyzer device may include a device that allows for simultaneous protocol analysis and error injection for the PCI board. The host emulation test stand and/or the interposer may include an electrical interface that provides a connection between the analyzer device and the PCI board. Further details of the user device, the analyzer device, the host emulation test stand, the interposer, and the PCI board are provided elsewhere herein.

Figure 1B:
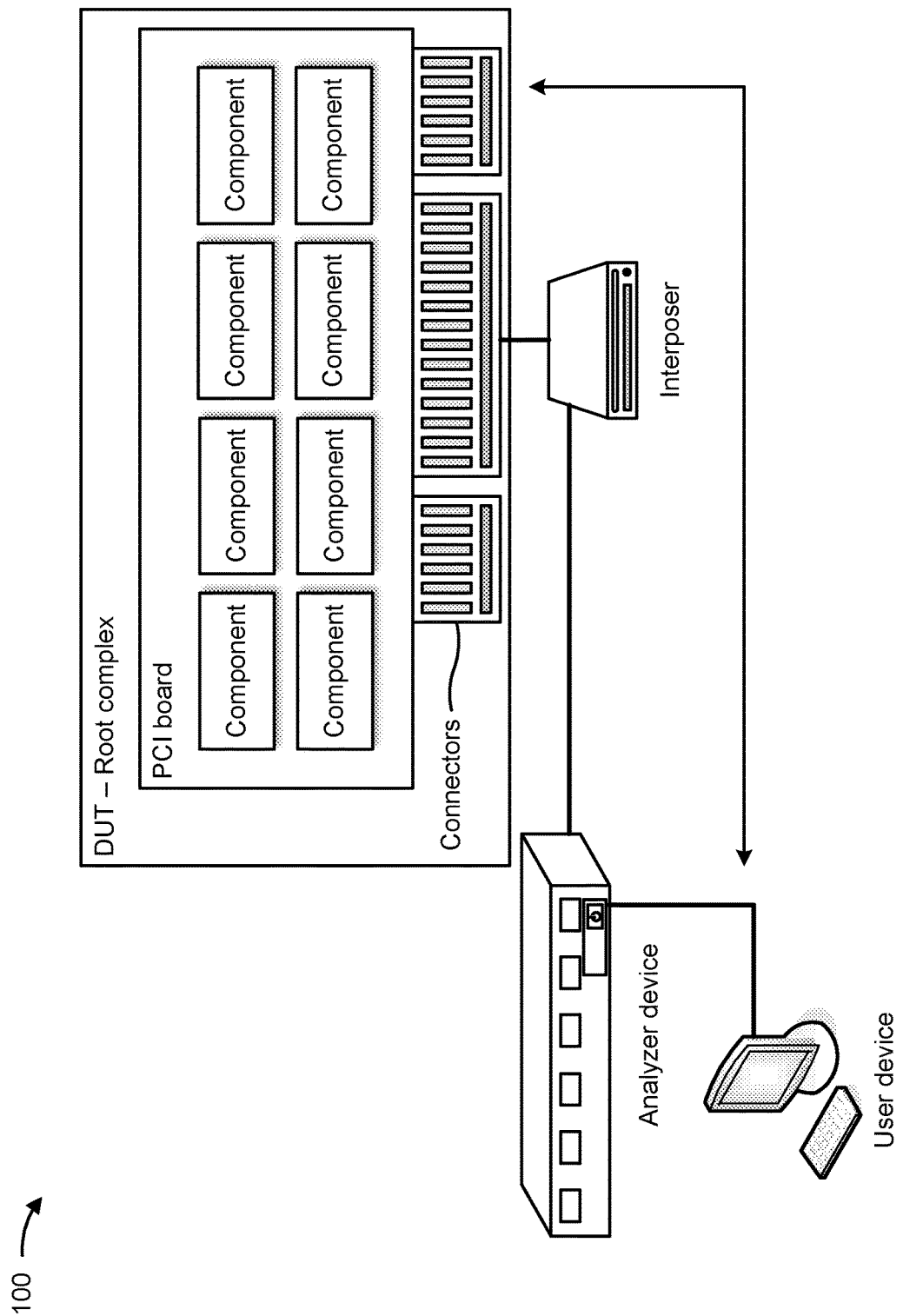

As shown in FIGS. 1A and 1B, the user device may connect and communicate with the analyzer device via a wireless or wired connection (e.g., a communication cable). The analyzer device may connect and communicate with the host emulation test stand/interposer via a wireless or wired connection (e.g., a communication cable). The host emulation test stand/interposer may include one or more connectors (e.g., slots) to receive and retain connectors of the PCI board. The connectors may enable the host emulation test stand/interposer to communicate with the PCI board. The PCI board may include one or more components, such as switches, bridges, endpoint device connectors, and/or the like.

The analyzer device may include a protocol test application that emulates either a PCIe root complex or a PCIe endpoint. The analyzer device may include a finite state machine (FSM) that can be utilized to represent and control execution flow. At any given time, the finite state machine may only be in one state. A finite state machine may transition to another state as a response to some inputs to the finite state machine. A state may include one or more transitions to another state. A path is an ordered sequence of states of a finite state machine. If a finite state machine transitions from state A to B and then to C, this path may be denoted by {A, B, C}. The LTSSM is a finite state machine that establishes a link between a PCIe downstream port (e.g., a port of a root complex or a switch facing "downstream") and a PCIe upstream port (e.g., a port of an endpoint device or a switch facing "upstream"). PCIe ordered sets may be input and output for most LTSSM states. For each state, the LTSSM defines which ordered sets are to be transmitted and which ordered sets are to be received in order to transition to another state.

The analyzer device may include LTSSM advanced state control, which is a set of features that enable very fine-grained control over the path of the LTSSM and the generated output traffic of the LTSSM. The advanced state control may control and manipulate a path through the LTSSM by inserting control states. The control states are not part of the PCIe specification, but enable simulation of paths through the LTSSM which are not defined in the PCIe specification. In addition, the control states enable changing a value of LTSSM state variables (e.g., a current link speed) in order to trigger unexpected behavior or to trigger transitions of the LTSSM which are not used in a normal operation mode and are therefore difficult to test. The advanced state control may manipulate (e.g., override) output ordered sets generated by the LTSSM, so that the device under test receives manipulated input traffic instead of traffic defined by the PCIe specification.

Figure 1C:
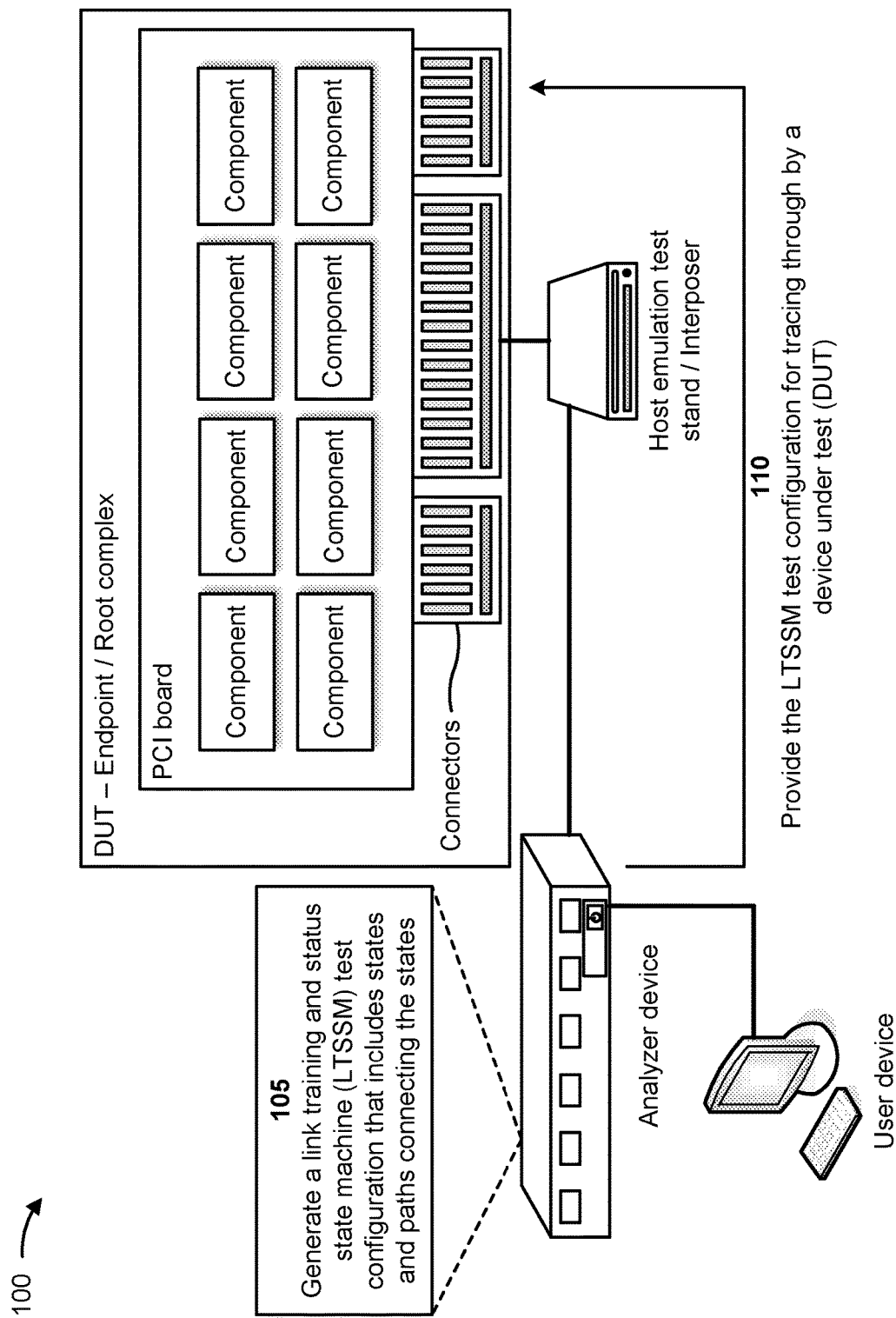

As shown in FIG. 1C, and by reference number 105, the analyzer device may generate a link training and status state machine (LTSSM) test configuration that includes states and paths connecting the states. For example, the analyzer device may generate an LTSSM that is a finite state machine that establishes a link between a PCIe downstream port (e.g., a port of a root complex or a switch facing "downstream") and a PCIe upstream port (e.g., a port of an endpoint or a switch facing "upstream"). PCIe ordered sets may be an input and an output for most LTSSM states. For each state, the LTSSM test configuration may define which ordered sets are to be transmitted and which ordered sets are to be received in order to transition to another state. At any given time, the LTSSM test configuration may only be in one state, and may transition to another state as a response to some inputs to the LTSSM test configuration. Each of the states of the LTSSM test configuration may include one or more transitions to another state. Each path of the LTSSM test configuration may include an ordered sequence of states of the LTSSM test configuration.

As further shown in FIG. 1C, and by reference number 110, the analyzer device may provide the LTSSM test configuration for tracing through by a device under test. For example, the analyzer device may provide the LTSSM test configuration to the host emulation test stand (e.g., when the device under test is the endpoint) or to the interposer (e.g., when the device under test is the root complex). The host emulation test stand and/or the interposer may provide the LTSSM test configuration to the device under test (e.g., the endpoint or the root complex). The device under test may receive the LTSSM test configuration and may trace through the LTSSM test configuration.

Figure 1D:
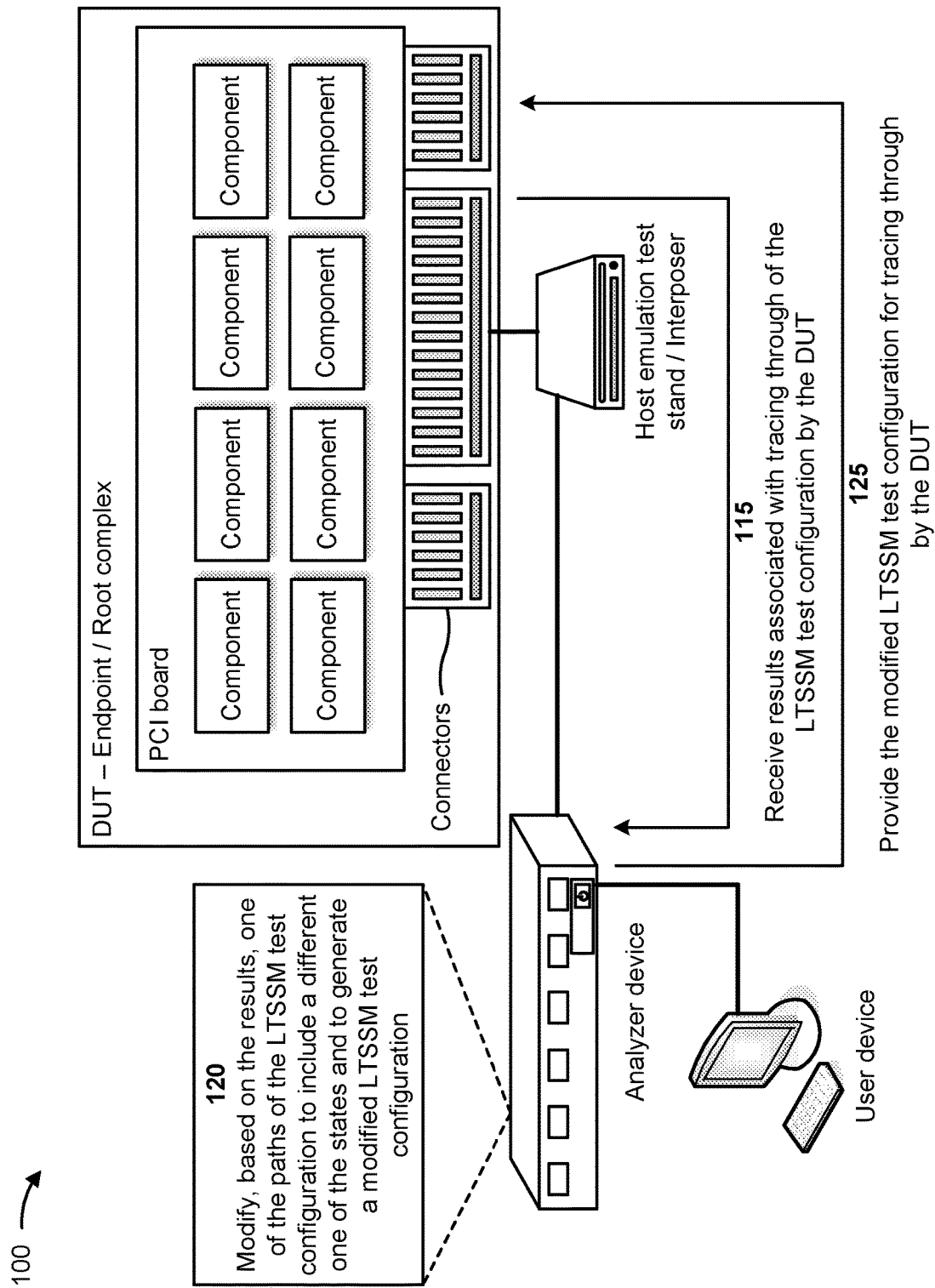

As shown in FIG. 1D, and by reference number 115, the analyzer device may receive results associated with tracing through the LTSSM test configuration by the device under test. For example, tracing through the LTSSM test configuration by the device under test may cause the device under test to generate results. The device under test may provide the results associated with tracing through of the LTSSM test configuration to the host emulation test stand and/or the interposer. The host emulation test stand and/or the interposer may provide the results associated with tracing through of the LTSSM test configuration to the analyzer device, and the analyzer device may receive the results associated with tracing through the LTSSM test configuration from the host emulation test stand and/or the interposer.

As further shown in FIG. 1D, and by reference number 120, the analyzer device may modify, based on the results, one of the paths of the LTSSM test configuration to include a different one of the states and to generate a modified LTSSM test configuration. For example, the analyzer device may modify one of the paths of LTSSM test configuration to jump to other state rather than a predetermined state set forth in the LTSSM test configuration. Modification of the one of the paths of the LTSSM test configuration may generate a modified LTSSM test configuration. In some implementations, the analyzer device may modify the LTSSM test configuration by controlling and manipulating a path through the LTSSM test configuration by inserting control states. The control states enable the analyzer device to simulate paths through the LTSSM, and enable modification of values of LTSSM state variables in order to trigger unexpected behavior or transitions of the LTSSM which are not used in a normal operation mode. In some implementations, the analyzer device may modify the LTSSM test configuration by manipulating (e.g., overriding) output ordered sets generated by the LTSSM test configuration. This may enable the device under test to utilize manipulated input traffic instead of traffic defined by the PCIe specification. In some implementations, the analyzer device may modify the LTSSM test configuration by providing a defined path. When the defined path is equal to an actual LTSSM path (e.g., a path match), the analyzer device may execute some defined actions (e.g., transition to a control state, enable an override instance, and/or the like).

As further shown in FIG. 1D, and by reference number 125, the analyzer device may provide the modified LTSSM test configuration for tracing through by the device under test. For example, the analyzer device may provide the modified LTSSM test configuration to the host emulation test stand (e.g., when the device under test is the endpoint) or to the interposer (e.g., when the device under test is the root complex). The host emulation test stand and/or the interposer may provide the modified LTSSM test configuration to the device under test (e.g., the endpoint or the root complex). The device under test may receive the modified LTSSM test configuration and may trace through the modified LTSSM test configuration.

Figure 1E:
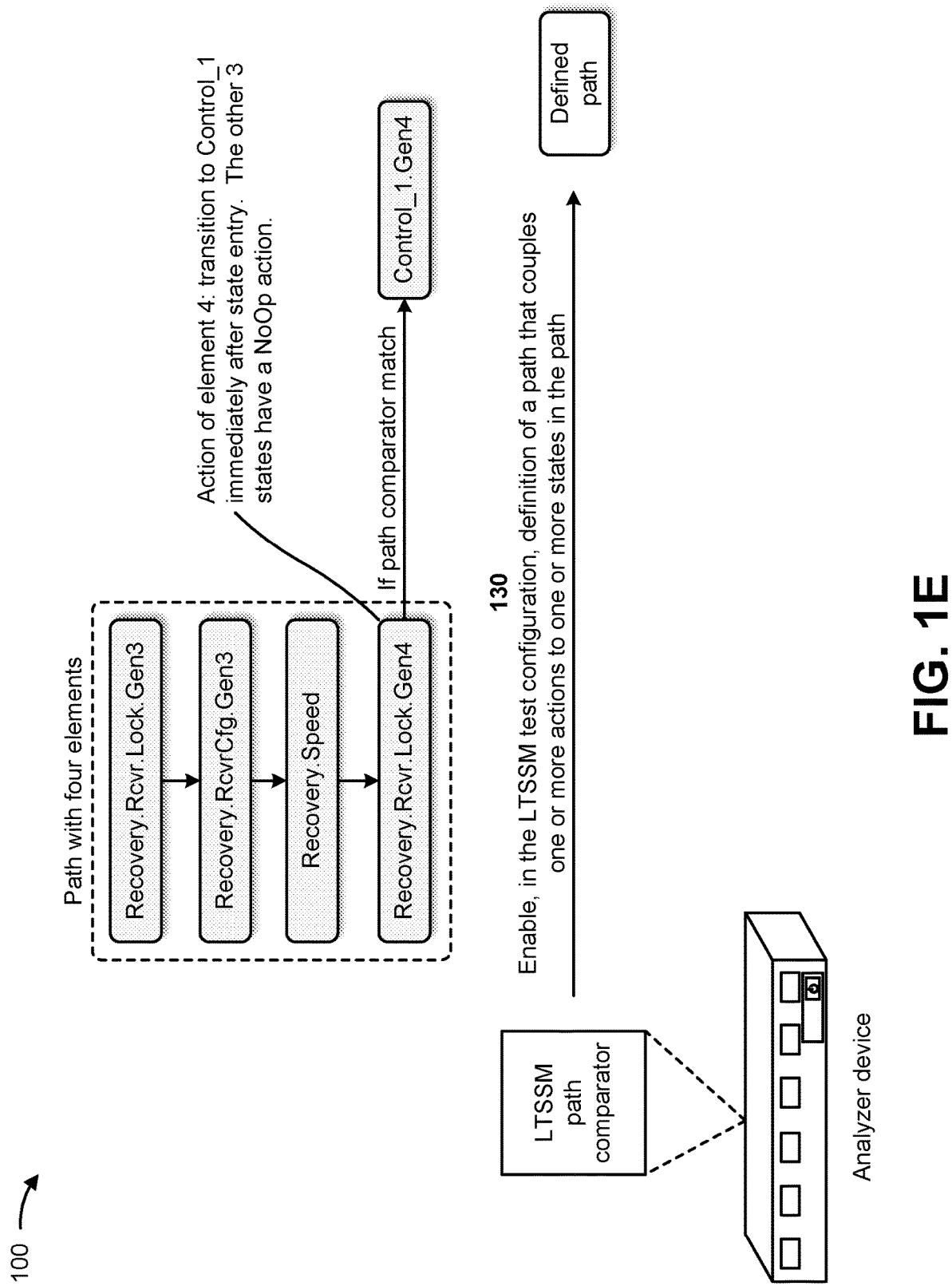

As shown in FIG. 1E, and by reference number 130, the analyzer device may enable, in the LTSSM test configuration, definition of a path that couples one or more actions to one or more states in the path. For example, the analyzer device may include an LTSSM path comparator that enables defining a path in the LTSSM with an N-tuple. The LTSSM path comparator may enable defining a path (e.g., a sequence of states) in the LTSSM. Each element in the path may be described with a 4-tuple (e.g., {LTSSM state, link speed, EQ phase and a set of state variables}). For example, the 4-tuple {Recovery. Equalization, Gen 4/Gen 5, Phase 2, changedSpeedRecovery=0} describes a state where the LTSSM is in Phase 2 of Recovery. Equalization at either Gen 4 or Gen 5 and the state variable changedSpeedRecovery is zero. An ordered sequence of this 4-tuple may be called an LTSSM path. If the actual path of the LTSSM is equal to the defined path (e.g., the LTSSM is inside the predefined path), the analyzer device, for every state of the path, may perform no operation; may enable, disable, and/or reset an override instance; may force a transition to a control state immediately after entry into a current state; may replace all default transitions of the current state (e.g., transitions defined by the PCIe specification) with a single transition to a control state (e.g., detour the LTSSM to a control state); and/or the like.

An advantage of coupling actions to states in a path is that an action is only executed if a current state and previous states are equal to a defined path. This may be helpful for states which can be entered from more than one state. For example, a first recovery sub-state (Recovery.RcvrLock) may be entered from L0, L0s, L1, Loopback, and other recovery sub-states. If a path {L0, Recovery.RcvrLock} is defined together with an action for Recovery.RcvrLock, the action may only execute if the LTSSM enters Recovery.RcvrLock from L0. If the LTSSM enters Recovery.RcvrLock from any other state, the action may not be executed. Additional members of a 4-tuple (e.g., link speed, EQ phase, and a set of state variables) may further extend a level of control granularity (e.g., define the path so that the action is only executed if the LTSSM enters Recovery.RcvrLock from L0 at Gen. 4 link speed).

In one example, as shown in FIG. 1E, the analyzer device may define a path that enables entry in a first control state (e.g., Control State 1) after a speed change from Gen. 3 to Gen. 4. The analyzer device may define a path (e.g., with four elements) which is equal to an LTSSM speed change path. The speed may be utilized as an additional parameter for the path so that the path only matches if a speed change from Gen. 3 to Gen. 4 is executed. The path can be denoted by: {LTSSM state, link speed, EQ phase and a set of state variables}; Element 0: {Recovery.RcvrLock.Gen3}→Action: NoOp (no operation); Element 1: {Recovery.RcvrCfg.Gen3}→Action: NoOp; Element 2: {Recovery. Speed}→Action: NoOp; and Element 3: {Recovery.RcvrLock.Gen4}→Action: Transition to Control_1 immediately after state entry.

FIG. 1F depicts an example of LTSSM path comparator registers provided by the analyzer device. The analyzer device may include a register interface that supports four LTSSM path comparators. Each LTSSM path comparator may include up to sixteen elements. If two LTSSM path comparators attempt to execute an action at the same time, the action of the LTSSM path comparator with a highest index may be executed first. As shown in FIG. 1F, the LTSSM path comparator registers may select a path comparator (e.g., path comparator X), may select an element (e.g., element Y) within the path comparator X, may define a state for the element Y, may define a link speed and an EQ phase for the element Y, may define variables for the element Y, may define an entry action for the element Y, may define an activity (e.g., an ordered set override) for the element Y, and/or the like.

Figure 1G:
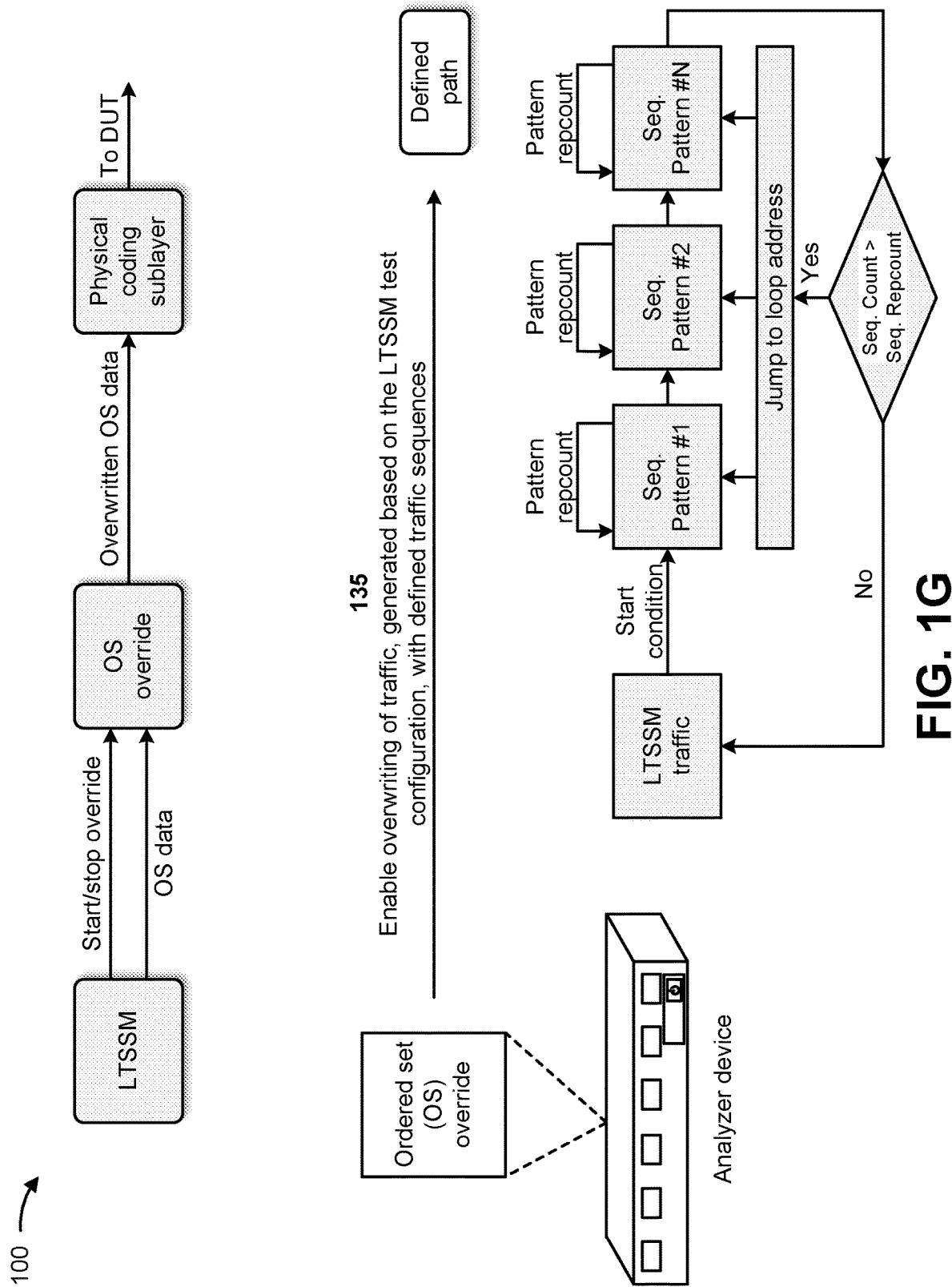

As shown in FIG. 1G, and by reference number 135, the analyzer device may enable overwriting of traffic, generated based on the LTSSM test configuration, with defined traffic sequences. For example, the analyzer device may include an ordered set (OS) override that overwrites traffic generated by the LTSSM with defined traffic sequences. An insertion of a sequence can be controlled from the LTSSM using the LTSSM path comparator. A user can also select which OS should be overwritten and which OS should be passed through. The sequence may be stored in memory and may include several bit patterns. Every pattern may include a bit mask and a lane mask that can be used to limit an insertion to a subset of lanes. Repetition of every pattern and repetition of the whole sequence may be programmable. An ordered set of override instances may be utilized to test state transitions defined in the PCIe specification. LTSSM state transitions typically depend on a quantity of received training ordered sets (TS1 OS and TS2 OS). For example, in Configuration. Complete, the next state is Configuration.Idle after all lanes receive eight consecutive TS2 OS with matching lane and link numbers. For a positive test, the ordered set of override instances may generate a repeating sequence of exactly eight TS2 OSs, with matching lane and link numbers, and a single TS2 OS with a different link number. This sequence generates a minimum amount of consecutive TS2 OSs for which a condition of the state transition is true. For a negative test, the ordered set of override instances may generate a sequence of exactly seven TS2 OSs, with matching lane and link numbers, and a single TS2 OS with a different link number. Alternatively, the ordered set of override instances may insert a sequence on a single lane. In both cases, a condition for the state transition is false.

In one example, as further shown in FIG. 1G, an LTSSM may provide a start and/or stop override and ordered set data to the ordered set override. The ordered set override may overwrite the ordered set data to generate overwritten ordered set data, and may provide the overwritten ordered set data to a physical coding sublayer (PCS) of the analyzer device. The PCS may provide logic for encoding, multiplexing, and synchronization of an outgoing symbol stream, as well as symbol code alignment, demultiplexing, and decoding of an incoming data stream. The PCS may process the overwritten ordered set data and may provide the processed and overwritten ordered set data to the device under test.

The analyzer device may support four independent ordered set (OS) override sequences with up to 512 patterns per sequence. A pattern may be defined by the following fields: OS type, OS data (128 bits), OS data mask (128 bits) (e.g., only masked bits will be overwritten with OS data), a lane mask (16 bits) (e.g., a pattern will only be inserted on masked lanes), and a pattern repetition count. In one example, as further shown in FIG. 1G, LTSSM traffic with a start condition may be processed by a first sequence pattern to generate a first pattern repetition count. The LTSSM traffic may be processed by a second sequence pattern to generate a second pattern repetition count. This process may continue until the LTSSM traffic is processed by an Nth sequence pattern to generate an Nth pattern repetition count.

Figure 1H:
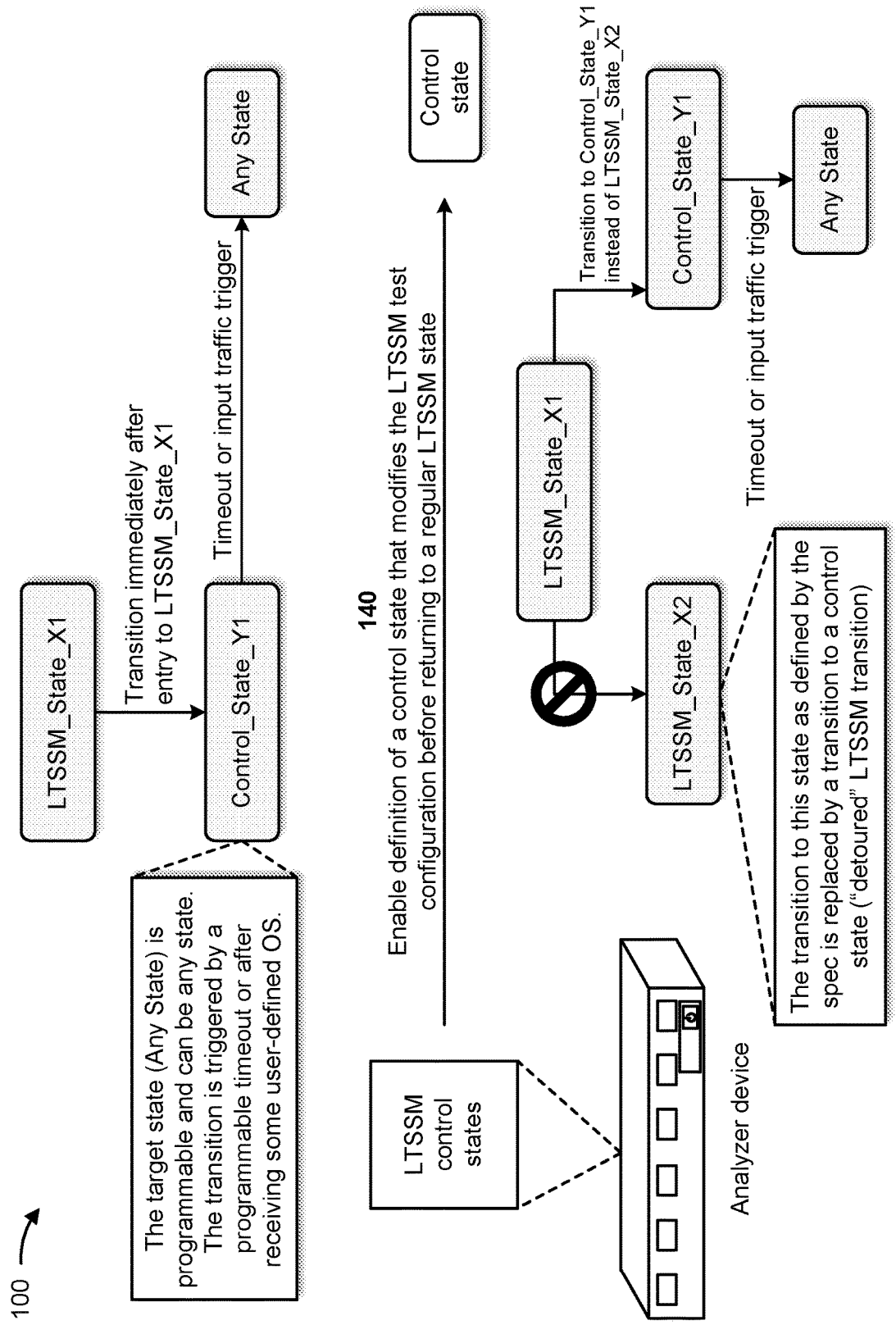

As shown in FIG. 1H, and by reference number 140, the analyzer device may enable definition of a control state that modifies the LTSSM test configuration before returning to a regular LTSSM state. For example, LTSSM control states enable changing a behavior of the LTSSM before returning to a regular LTSSM state. Control states are not part of the LTSSM defined in the PCIe Gen. 5 base specification. A control state can only be entered by a state comparator action. A control state may include a state transition with a configurable state transition condition. For the transition condition, a timeout and a set of OS comparators which compare the received traffic against defined ordered sets may be selected. If the transition condition is true, the LTSSM transitions to the defined target state. By default, a control state does not affect the traffic generated by the LTSSM, such that the LTSSM continues to send the traffic from the previous regular LTSSM state. A control state can also be used to force the values of the following LTSSM state variables: targetLinkSpeed, currentLinkSpeedSupported, currentLinkSpeed, PCIe_DirectedSpeedChange, PCIe_SpeedChangedRecovery, and/or the like. Variables with a PCIe prefix may be defined in the PCIe base specification. All other variables may include internal variables of the analyzer device LTSSM. Additional PCIe and internal variables may be added to the control states if needed.

The LTSSM path comparator of the analyzer device provides actions which can be used to enter a control state. For example, the LTSSM path comparator may enable a transition immediately to the control state after entry to a regular LTSSM state. This process enters the control state immediately after the LTSSM enters a regular LTSSM state (e.g., LTSSM_State_X1) with a corresponding defined action. This means that the LTSSM may start sending the traffic that is defined for LTSSM_State_X1 but then goes to a control state (e.g., Control_State_Y1) and stays there until the defined exit transition is triggered. Although the analyzer device by default still sends the traffic defined for LTSSM_State_X1, the transitions out of LTSSM_State_X1 may not be triggered by the incoming traffic because the LTSSM is not in this state. From the DUT's point of view, the LTSSM is "locked" into LTSSM_State_X1. This mechanism may be utilized to trigger timeout transitions in the DUT's LTSSM which are never used in a normal operation mode and therefore difficult to verify. In order to return to a regular LTSSM state, a target state and a condition may be defined that triggers the transition to this target state. The target state can be any state.

For example, as further shown in FIG. 1H, the LTSSM may transition to a control state (e.g., Control_State_Y1) immediately after entering an LTSSM state (e.g., LTSSM_State_X1). The control state may transition to any state after a timeout or an input traffic trigger. A target state (e.g., any state) may be programmable and can be any state. The transition to the target state may be triggered by a programmable timeout or after receiving some defined ordered set.

In another example, the LTSSM path comparator may enable transition to a control state instead of a regular LTSSM state. This process enables overriding all default transitions (e.g., transitions defined by the PCIe specification) with a transition to a single, programmable control state. This means that the LTSSM remains in a current state until a condition for a regular state transition becomes true, but instead of going to the state that is defined for the transition in the PCIe specification, the LTSSM goes to a control state. The advantage of this process is that the conditions defined by the PCIe specification are still active for a given state (e.g., LTSSM_State_X1), but the target states for these transitions are replaced by a control state. Using this process, the control states can be seen as out-of-specification intermediate states that are used to enable out-of-specification paths through the LTSSM without changing the logic for the states defined by the PCIe specification. By design, it is not possible to accidentally trigger unwanted out-of-specification transitions if a control state is not utilized. In addition, the control states can be used to change LTSSM state variables. Control states together with the LTSSM path comparator enable complex test scenarios and deterministic out-of-specification behavior. The test scenarios are not limited to hard-coded tests. Instead, the control states offer a modular system which can be used to program scenarios as needed.

For example, as further shown in FIG. 1H, instead of transitioning to an LTSSM state (e.g., LTSSM_State_X2), the LTSSM may transition to a control state (e.g., Control_State_Y1) immediately after entering an LTSSM state (e.g., LTSSM_State_X1). The transition to the LTSSM state (e.g., LTSSM_State_X2) may be disabled and the LTSSM may be detoured to the control state (e.g., Control_State_Y1). The control state may transition to any state after a timeout or an input traffic trigger.

FIG. 1I depicts an example of control state registers provided by the analyzer device. As shown, the control state registers may select a control state (e.g., control state Z), may define a condition for the control state Z (e.g., a timeout and/or OS comparators), may define a target state for a transition, may define a state for an element (e.g., element Y), may define configuration activity for the control state Z, may provide a time value that is only used if a timeout is enabled in the condition for the control state Z, may enable a user to change a value for some state variables, and/or the like.

In this way, the analyzer device may test different states (e.g., other than predetermined states) of a PCI board. For example, the analyzer device may enable a user to program the analyzer device to break rules defined in the PCI express protocol for LTSSM functionality, and to force a device under test into various corner case conditions involving state timing and timeouts, state transitions, link speed changes (e.g., several speed changes back-to-back), lane assignment, error recovery, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
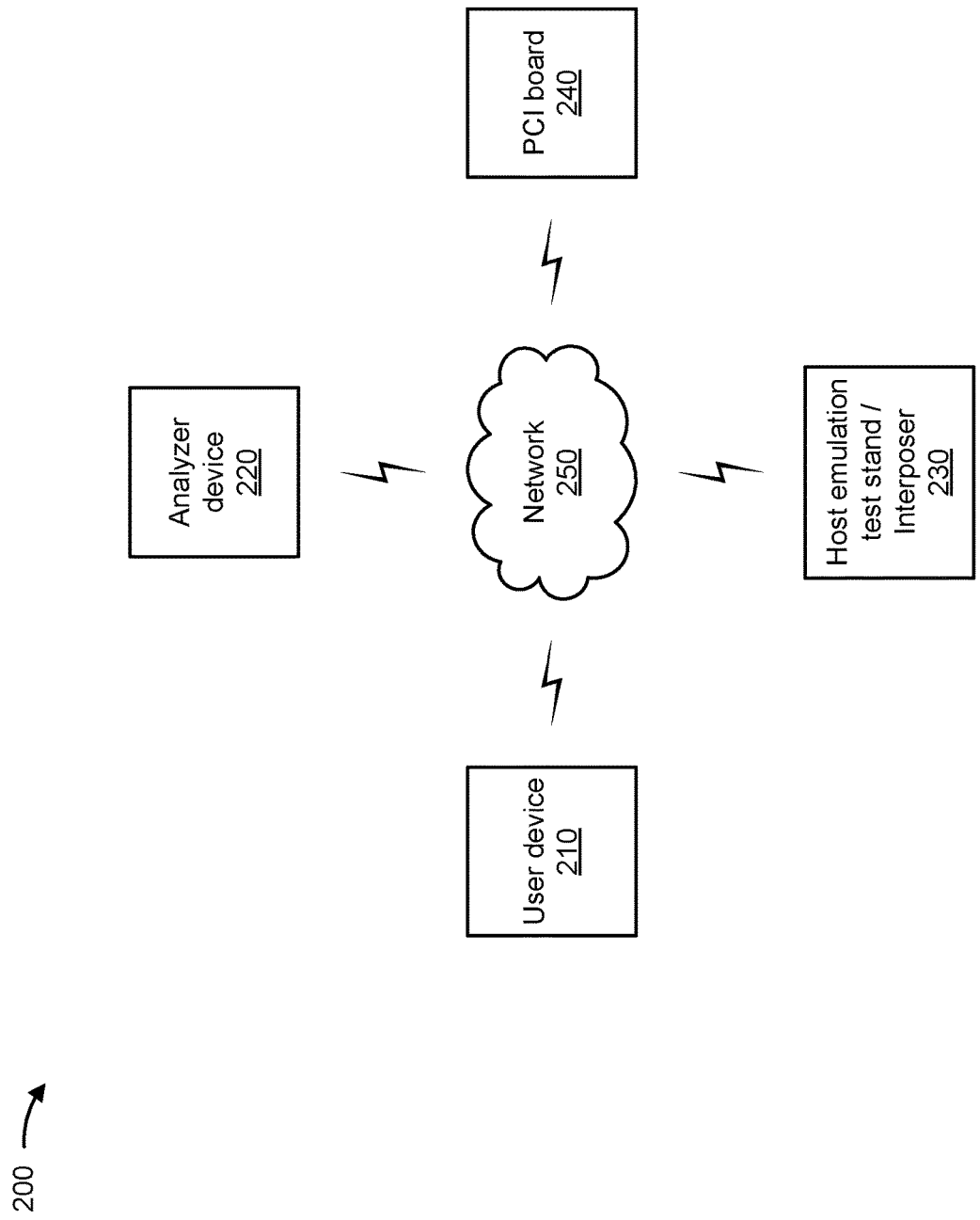
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an analyzer device 220, a host emulation test stand/interposer 230, a PCI board 240, and/or a network 250. Devices and/or elements of environment 200 may interconnect via wired connections and/or wireless connections.

The user device 210 includes one or more devices capable of receiving, generating, storing, processing, and/or providing information, as described elsewhere herein. The user device 210 may include a communication device and/or a computing device. For example, the user device 210 may include a wireless communication device, a mobile phone, a laptop computer, a tablet computer, a gaming console, a wearable communication device (e.g., a smart wristwatch, a pair of smart eyeglasses, a head mounted display, or a virtual reality headset), or a similar type of device.

The analyzer device 220 includes one or more devices capable of receiving, generating, storing, processing, and/or providing information, as described elsewhere herein. For example, the analyzer device 220 may include a device that allows for simultaneous protocol analysis and error injection for protocol traffic at all layers of a protocol stack. The analyzer device 220 may include multicolored light-emitting diodes (LEDs) on a front panel that specify link speed, lane width, and signal quality. The analyzer device 220 may provide advanced PCIe and non-volatile memory express (NVMe) trigger and search capabilities designed to reduce debug and problem resolution down time. The analyzer device 220 may support latest PCIe and NVMe specifications and may alert a user (e.g., via the user device 210) to errors at every layer of the PCIe stack, including state and sub-state level errors. The analyzer device 220 may autotune the host emulation test stand/interposer 230, may provide a configuration space viewer, may calculate PCIe link performance measurements, may trace view packet compression, and/or the like.

The host emulation test stand/interposer 230 includes one or more devices capable of receiving, generating, storing, processing, and/or providing information, as described elsewhere herein. For example, the host emulation test stand/interposer 230 may include an electrical interface that provides routing from one socket or connection to another socket or connection. The host emulation test stand/interposer 230 may spread a connection to a wider pitch or may reroute a connection to a different connection. For example, the host emulation test stand/interposer 230 may provide a connection between the analyzer device 220 and the PCI board 240 under test. The host emulation test stand/interposer 230 may enable protocol analysis of communication between the PCI board 240 and the user device 210 and analyzer device 220. The PCI board 240 includes one or more devices capable of receiving, generating, storing, processing, and/or providing information, as described elsewhere herein. For example, the PCI board 240 may include a local computer bus for attaching hardware devices in a computer and may be part of a PCI local bus standard. The PCI board 240 may support functions found on a processor bus but in a standardized format that is independent of any given processor's native bus. Devices connected to the PCI board 240 may appear to a bus master to be connected directly to its own bus and may be assigned addresses in the processor's address space.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, a PCIe network, and/or a combination of these or other types of networks. The network 250 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
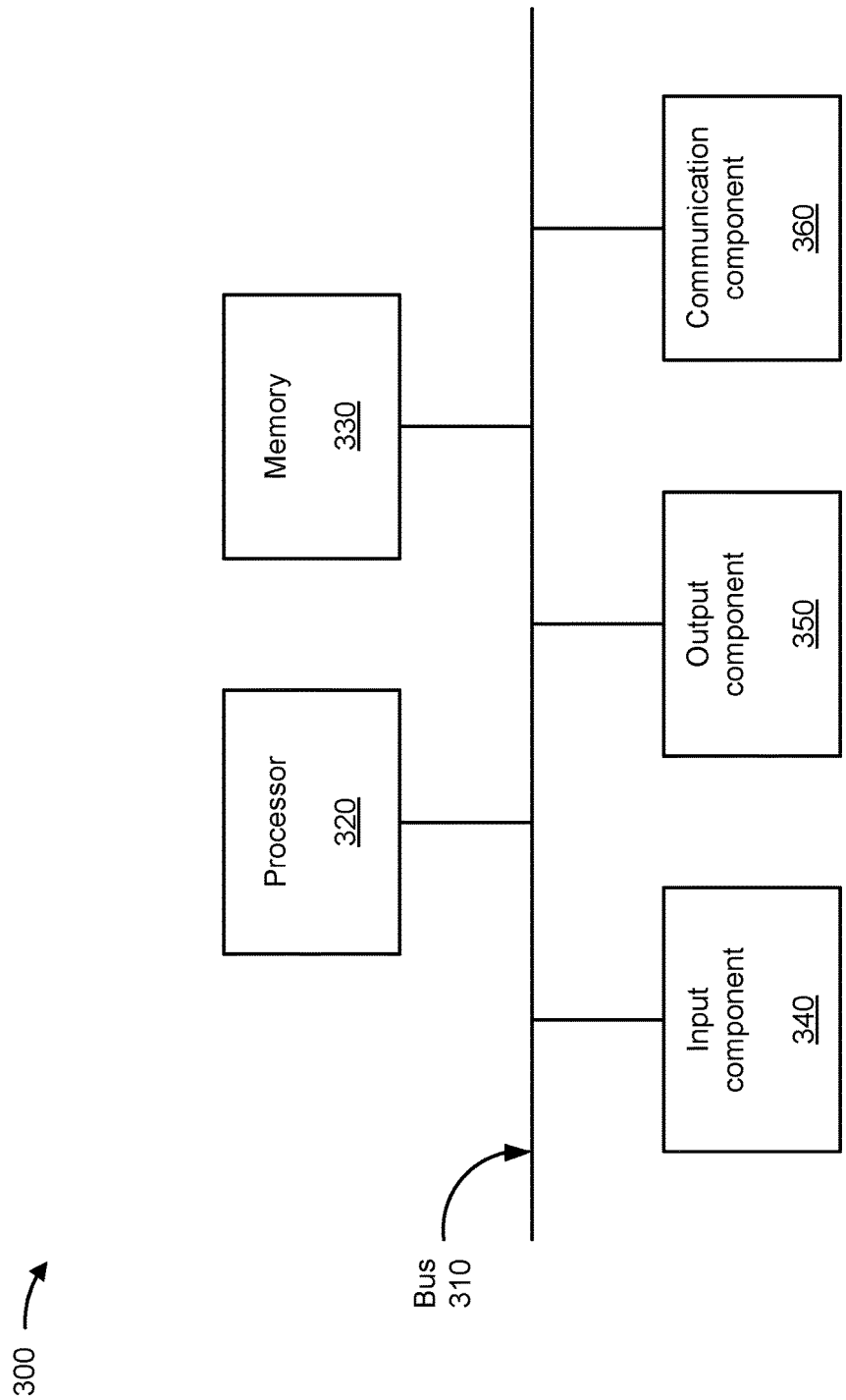
FIG. 3 is a diagram of example components of one or more devices of FIG. 2.

FIG. 3 is a diagram of example components of a device 300, which may correspond to the user device 210, the analyzer device 220, the host emulation test stand/interposer 230, and/or the PCI board 240. In some implementations, the user device 210, the analyzer device 220, the host emulation test stand/interposer 230, and/or the PCI board 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
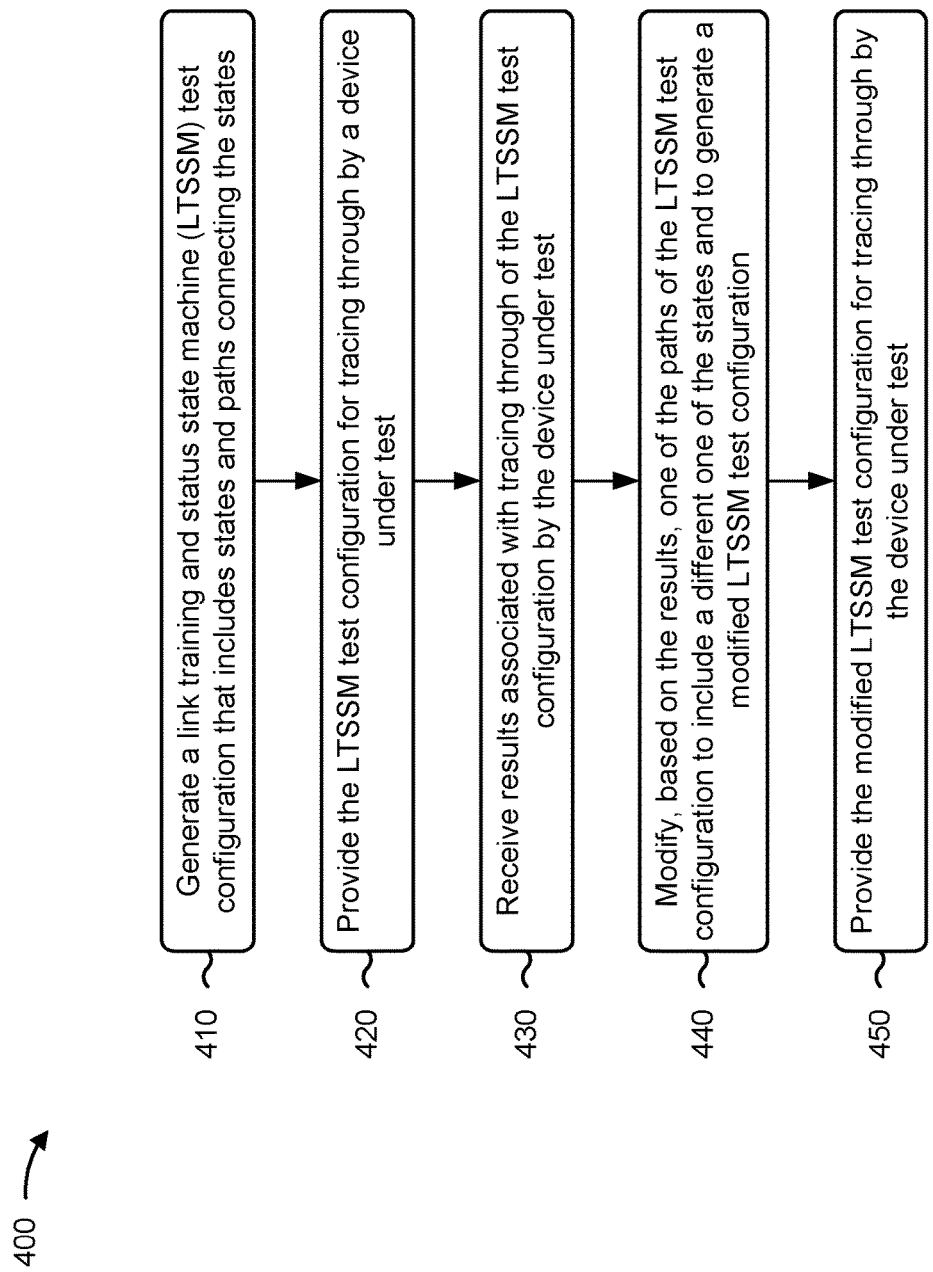
FIG. 4 is a flowchart of an example process for providing a PCI board programmable LTSSM and state branching mechanism.

FIG. 4 is a flowchart of an example process 400 for providing a PCI board programmable LTSSM and state branching mechanism. In some implementations, one or more process blocks of FIG. 4 may be performed by a device (e.g., the analyzer device 220). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include generating an LTSSM test configuration that includes states and paths connecting the states (block 410). For example, the device may generate an LTSSM test configuration that includes states and paths connecting the states, as described above.

As further shown in FIG. 4, process 400 may include providing the LTSSM test configuration for tracing through by a device under test (block 420). For example, the device may provide the LTSSM test configuration for tracing through by a device under test, as described above. In some implementations, the device under test is an endpoint device or a root complex device.

As further shown in FIG. 4, process 400 may include receiving results associated with tracing through of the LTSSM test configuration by the device under test (block 430). For example, the device may receive results associated with tracing through of the LTSSM test configuration by the device under test, as described above.

As further shown in FIG. 4, process 400 may include modifying, based on the results, one of the paths of the LTSSM test configuration to include a different one of the states and to generate a modified LTSSM test configuration (block 440). For example, the device may modify, based on the results, one of the paths of the LTSSM test configuration to include a different one of the states and to generate a modified LTSSM test configuration, as described above.

As further shown in FIG. 4, process 400 may include providing the modified LTSSM test configuration for tracing through by the device under test (block 450). For example, the device may provide the modified LTSSM test configuration for tracing through by the device under test, as described above.

In some implementations, process 400 includes providing, in the LTSSM test configuration, a defined path that couples one or more actions to one or more states in the defined path. In some implementations, an LTSSM path comparator of the device enables definition of the path that couples the one or more actions to the one or more states in the path. In some implementations, process 400 includes determining whether an actual path of the LTSSM test configuration is equal to the defined path, and performing an action based on determining that the actual path is equal to the defined path. In some implementations, performing the action includes one of performing no operation; enabling, disabling, or resetting an ordered state override instance of the LTSSM test configuration; forcing a transition to a control state of the LTSSM test configuration; or replacing default transitions of the LTSSM test configuration with a single transition to another control state.

In some implementations, process 400 includes receiving additional results associated with tracing through of the modified LTSSM test configuration by the device under test; modifying, based on the additional results, the modified LTSSM test configuration to generate a further modified LTSSM test configuration; and providing the further modified LTSSM test configuration for tracing through by the device under test.

In some implementations, process 400 includes enabling traffic, generated based on the LTSSM test configuration, to be overwritten with defined traffic sequences. In some implementations, process 400 includes selecting one or more ordered sets from the traffic, and enabling the one or more ordered sets to be overwritten with the defined traffic sequences. In some implementations, process 400 includes processing the traffic overwritten with the defined traffic sequences, with a physical coding sublayer, prior to providing the traffic to the device under test.

In some implementations, process 400 includes enabling definition of a control state that modifies the LTSSM test configuration before returning to a regular LTSSM state. In some implementations, the control state is transitioned to immediately after the LTSSM test configuration enters the regular LTSSM state. In some implementations, the control state overrides default transitions provided in the LTSSM test configuration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   generating, by a device, a link training and status state machine (LTSSM) test configuration that includes states and paths connecting the states;
   providing, by the device, the LTSSM test configuration for tracing through by a device under test;
   receiving, by the device, results associated with tracing through of the LTSSM test configuration by the device under test;
   modifying, by the device and based on the results, one of the paths of the LTSSM test configuration to include a different one of the states and to generate a modified LTSSM test configuration; and
   providing, by the device, the modified LTSSM test configuration for tracing through by the device under test.

2. The method of claim 1, further comprising:
   providing, in the LTSSM test configuration, a defined path that couples one or more actions to one or more states in the defined path.

3. The method of claim 2, wherein an LTSSM path comparator of the device enables definition of the path that couples the one or more actions to the one or more states in the path.

4. The method of claim 2, further comprising:
   determining whether an actual path of the LTSSM test configuration is equal to the defined path; and
   performing an action based on determining that the actual path is equal to the defined path.

5. The method of claim 4, wherein performing the action comprises one of:
   performing no operation;
   enabling, disabling, or resetting an ordered state override instance of the LTSSM test configuration;
   forcing a transition to a control state of the LTSSM test configuration; or
   replacing default transitions of the LTSSM test configuration with a single transition to another control state.

6. The method of claim 1, wherein the device under test is an endpoint device or a root complex device.

7. The method of claim 1, further comprising:
   receiving additional results associated with tracing through of the modified LTSSM test configuration by the device under test;
   modifying, based on the additional results, the modified LTSSM test configuration to generate a further modified LTSSM test configuration; and
   providing the further modified LTSSM test configuration for tracing through by the device under test.

8. A device, comprising:
one or more memories; and
one or more processors, coupled to the one or more memories, configured to:
   generate a link training and status state machine (LTSSM) test configuration that includes states and paths connecting the states;
   provide the LTSSM test configuration for tracing through by a device under test,
      wherein the device under test is an endpoint device or a root complex device;
   receive results associated with tracing through of the LTSSM test configuration by the device under test;
   modify, based on the results, one of the paths of the LTSSM test configuration to include a different one of the states and to generate a modified LTSSM test configuration; and
   provide the modified LTSSM test configuration for tracing through by the device under test.

9. The device of claim 8, wherein the one or more processors are further configured to:
   enable traffic, generated based on the LTSSM test configuration, to be overwritten with defined traffic sequences.

10. The device of claim 9, wherein the one or more processors are further configured to:
   select one or more ordered sets from the traffic; and
   enable the one or more ordered sets to be overwritten with the defined traffic sequences.

11. The device of claim 9, wherein the one or more processors are further configured to:
   process the traffic overwritten with the defined traffic sequences, with a physical coding sublayer, prior to providing the traffic to the device under test.

12. The device of claim 8, wherein the one or more processors are further configured to:
   enable definition of a control state that modifies the LTSSM test configuration before returning to a regular LTSSM state.

13. The device of claim 12, wherein the control state is transitioned to immediately after the LTSSM test configuration enters the regular LTSSM state.

14. The device of claim 12, wherein the control state overrides default transitions provided in the LTSSM test configuration.

15. A non-transitory computer-readable medium storing a set of instructions, the set of instructions comprising:
   one or more instructions that, when executed by one or more processors of a device, cause the device to:
      generate a link training and status state machine (LTSSM) test configuration that includes states and paths connecting the states;
      provide the LTSSM test configuration for tracing through by a device under test;
      receive results associated with tracing through of the LTSSM test configuration by the device under test;
      modify, based on the results, the LTSSM test configuration to generate a modified LTSSM test configuration; and
      provide the modified LTSSM test configuration for tracing through by the device under test.

16. The non-transitory computer-readable medium of claim 15, wherein the one or more instructions further cause the device to:
   provide, in the LTSSM test configuration, a defined path that couples one or more actions to one or more states in the defined path;
   determine whether an actual path of the LTSSM test configuration is equal to the defined path; and
   perform an action based on determining that the actual path is equal to the defined path.

17. The non-transitory computer-readable medium of claim 16, wherein the one or more instructions, that cause the device to perform the action, cause the device to one of:
   perform no operation;
   enable, disable, or reset an ordered state override instance of the LTSSM test configuration;
   force a transition to a control state of the LTSSM test configuration; or
   replace default transitions of the LTSSM test configuration with a single transition to another control state.

18. The non-transitory computer-readable medium of claim 15, wherein the one or more instructions further cause the device to:
   receive additional results associated with tracing through of the modified LTSSM test configuration by the device under test;
   modify, based on the additional results, the modified LTSSM test configuration to generate a further modified LTSSM test configuration; and
   provide the further modified LTSSM test configuration for tracing through by the device under test.

19. The non-transitory computer-readable medium of claim 15, wherein the one or more instructions further cause the device to:
   enable traffic, generated based on the LTSSM test configuration, to be overwritten with defined traffic sequences; and
   process the traffic overwritten with the defined traffic sequences, with a physical coding sublayer, prior to providing the traffic to the device under test.

20. The non-transitory computer-readable medium of claim 15, wherein the one or more instructions further cause the device to:
   enable definition of a control state that modifies the LTSSM test configuration before returning to a regular LTSSM state,
      wherein the control state is transitioned to immediately after the LTSSM test configuration enters the regular LTSSM state, or
      wherein the control state overrides default transitions provided in the LTSSM test configuration.

\* \* \* \* \*